United States Patent
Jain et al.

(10) Patent No.: US 9,430,392 B2
(45) Date of Patent: Aug. 30, 2016

(54) SUPPORTING LARGE PAGES IN HARDWARE PREFETCHERS

(71) Applicants: Prabhat Jain, Hillsboro, OR (US); Ashok Jagannathan, Bangalore, IN (US)

(72) Inventors: Prabhat Jain, Hillsboro, OR (US); Ashok Jagannathan, Bangalore, IN (US)

(73) Assignee: Intel Corporation, Santa Clara, CA (US)

( * ) Notice: Subject to any disclaimer, the term of this patent is extended or adjusted under 35 U.S.C. 154(b) by 91 days.

(21) Appl. No.: 14/225,715

(22) Filed: Mar. 26, 2014

(65) Prior Publication Data
US 2015/0278099 A1 Oct. 1, 2015

(51) Int. Cl.
*G06F 12/08* (2016.01)
*G06F 9/38* (2006.01)

(52) U.S. Cl.
CPC ......... *G06F 12/0862* (2013.01); *G06F 9/3806* (2013.01); *G06F 9/3812* (2013.01); *G06F 2212/1024* (2013.01); *G06F 2212/602* (2013.01); *G06F 2212/6022* (2013.01); *G06F 2212/6026* (2013.01)

(58) Field of Classification Search
CPC .................................................. G06F 12/0862
USPC .......................................................... 711/137
See application file for complete search history.

(56) References Cited

U.S. PATENT DOCUMENTS

| 5,734,881 A * | 3/1998 | White .................. G06F 9/3806 712/238 |
| 5,778,423 A * | 7/1998 | Sites et al. ..................... 711/118 |
| 6,122,729 A * | 9/2000 | Tran ..................... G06F 9/30152 712/244 |
| 6,792,496 B2 * | 9/2004 | Aboulenein ........ G06F 13/4031 710/306 |
| 2003/0028694 A1 * | 2/2003 | Aboulenein ........ G06F 13/4031 710/107 |
| 2014/0195772 A1 * | 7/2014 | McCormick, Jr. ............ 711/205 |
| 2015/0026414 A1 * | 1/2015 | Kalamatianos et al. ...... 711/137 |

* cited by examiner

*Primary Examiner* — Pierre-Michel Bataille
(74) *Attorney, Agent, or Firm* — Lowenstein Sandler LLP

(57) ABSTRACT

Technologies for supporting large pages in hardware prefetchers are described. A processor includes a processor core comprising a pipeline, cache memory and a hardware prefetcher coupled to the processor core and the cache memory. The hardware prefetcher is a region-based hardware prefetcher to track memory regions of a predefined region size that is defined by software to be executed by the processor. The hardware prefetcher is operative to receive incoming requests and track different memory regions of predefined size with multiple streams in a stream table with stream entries. The hardware prefetcher generates a prefetch request and determines whether the prefetch request goes beyond a page boundary of the one memory region. The hardware prefetcher creates a new stream entry to track a successive memory region when the prefetch request goes beyond the page boundary of the one memory region, allowing subsequent prefetch requests to the successive memory region.

20 Claims, 12 Drawing Sheets

SUPPORTING LARGE PAGES IN HARDWARE PREFETCHERS

TECHNICAL FIELD

Embodiments described herein generally relate to processing devices and, more specifically, relate to technologies for supporting large pages in hardware prefetchers and operating the same.

BACKGROUND

Prefetching in general means bringing data or instructions from memory into the cache before they are needed. When an application needs data that was prefetched, instead of waiting for the data from memory, the application can retrieve the data from cache and continue execution. There are generally two main ways in which prefetching can occur: initiated by hardware or initiated by software. Hardware prefetching can bring data into Level-one (L1) cache, Level-two (L2) cache, or both. A hardware prefetcher can implement an algorithm that monitors data access patterns for a particular cache and then tries to predict what addresses will be needed in the future.

DESCRIPTION OF EMBODIMENTS

Figure 1:
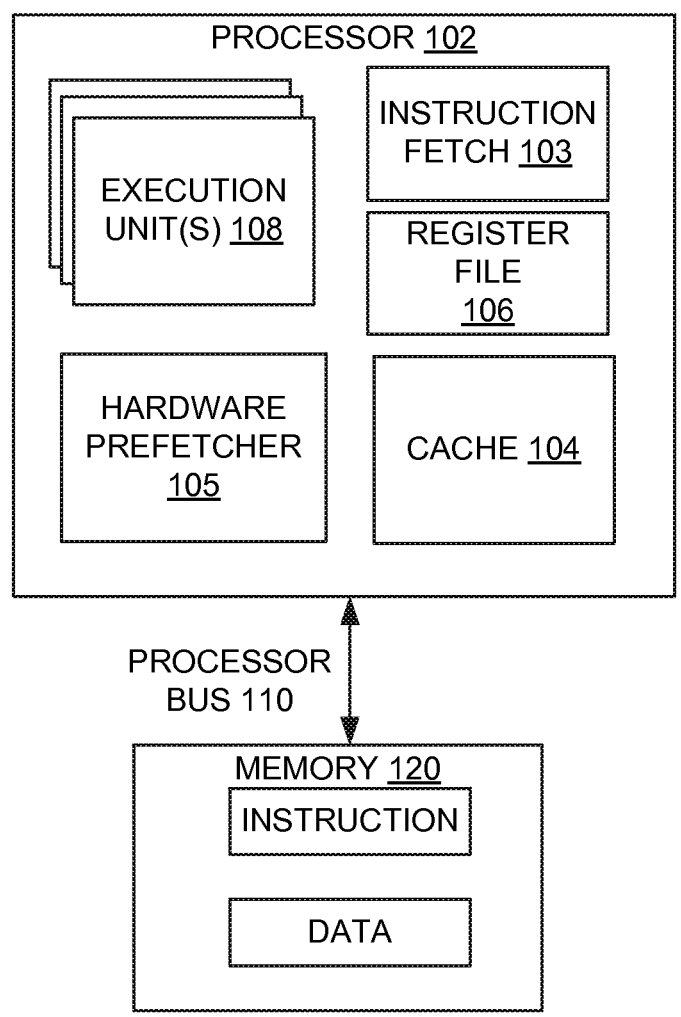
FIG. 1 is a block diagram illustrating a computing system that implements a hardware prefetcher for prefetching larger pages according to one embodiment.

Technologies for supporting large pages in hardware prefetchers are described. As described above, prefetching in general means bringing data or instructions from memory into the cache before they are needed. When an application needs data that was prefetched, instead of waiting for the data from memory, the application can retrieve the data from cache and continue execution. Hardware prefetching can bring data into L1 cache, L2 cache, or both. A hardware prefetcher can implement an algorithm that monitors data access patterns for a particular cache and then tries to predict what addresses will be needed in the future. Conventional hardware prefetchers are limited to prefetching data from smaller memory regions (e.g., 4 KB pages) in order to not violate memory access restrictions imposed by an operating system. That is, the memory regions are defined to have a predefined region size. Prefetching within page boundaries of the memory regions (e.g., 4 KB pages) may limit the effectiveness of the hardware prefetchers when the memory access pattern of a program is spread over a region larger than the predefined region size of 4 KB. Due to page access restrictions, conventional hardware prefetchers stop issuing prefetch requests when they reach a page boundary of a 4 KB page. For example, the conventional hardware prefetcher stops issuing prefetch requests when it reaches the end of a particular 4 KB memory region since the memory access privileges of the successive 4 KB region is not known to the conventional hardware prefetcher. The hardware prefetcher is designed to wait for a program's demand memory access to the next 4 KB region to initiate prefetching from that next 4 KB region. This may introduce latency of hundreds of cycles for the conventional hardware prefetcher to start prefetching from the next 4 KB memory region, limiting the benefit of the conventional hardware prefetcher.

The embodiments described herein relate to improving the effectiveness of the hardware prefetchers by enabling the hardware prefetchers to seamlessly prefetch data over larger memory regions than the predefined region size defined by software (e.g., operating system). In one implementation of region-based hardware prefetchers, the hardware prefetcher tracks access pattern within a predetermined region size (typically 4 KB) and issues prefetch requests within that memory region based on observed history of accesses within that memory region. In some embodiments, instead of stopping issuance of prefetch requests when the page boundary is reached and waiting for the program's demand memory access, the hardware prefetchers described herein are enabled to know the memory access privileges of the successive memory region (e.g., next 4 KB region) ahead of time, and are allowed to start prefetching from the successive memory region when it reaches a page boundary (e.g., reaches the end of the current 4 KB region) based on the memory access privileges. The embodiments described herein may reduce the latency normally caused when transitioning from one memory region to the successive memory region in the prefetcher. In particular, the hardware prefetcher does not have to wait for a memory demand request to the successive memory region to start prefetching in the successive memory region.

According to some alternative embodiments, the hardware prefetcher can track memory regions of a larger size, as defined by the operating system. For example, the hardware prefetcher can track memory regions having the size of 2 MB, instead of 4 KB. This may enable the hardware prefetcher to cross 4 KB boundaries without paying the waiting time penalty for the next demand access.

The embodiments described below are directed to technologies for supporting large pages in hardware prefetchers. In one embodiment, a processor includes a processor core comprising a pipeline, cache memory coupled to the processor core and a hardware prefetcher coupled to the processor core and the cache memory. The hardware prefetcher is a region-based hardware prefetcher that tracks memory regions of a predefined region size. The hardware prefetcher is operative to receive from the pipeline incoming requests into the cache memory. The hardware prefetcher tracks multiple streams in a stream table with stream entries, each stream entry to track a different memory region of the predefined size. The baseline behavior for a hardware prefetcher according to one embodiment is to pick from one of the several valid tracked streams every cycle and issue a prefetch to one of the cache lines in the memory region being tracked by the stream entry (typically 4 KB) as per its state and algorithm. Without large page support, when a request crosses the region boundary (4 KB) the stream is invalidated. With large page support, if the 4 KB region being tracked was a part of a 2 MB page, which would be indicated by the core request that created this 4 KB stream entry, then the hardware prefetcher generates a rollover request, unless the end of 2 MB region has also been hit. The rollover request would be populated by the hardware prefetcher with all the information needed to instantiate an active stable stream when receiving and processing the rollover request. The populated rollover request allows prefetching to start from the region pointed by the rollover request without waiting for a core request to this region, as described herein. On receiving a rollover request, the hardware prefetcher checks if the hardware prefetcher already has a stream entry tracking the memory region pointed to by the rollover request. If yes, the request is dropped it. If not, then a new stable entry is created with all the details from the rollover request so that lines from that region can be immediately prefetched. Whereas, in the baseline prefetcher, whenever a new stream entry is created it needs to wait for a few more accesses to stabilize and determine the characteristics of the stream (like direction, etc.) before prefetching from that region. The rollover request eliminates this stabilization latency and the consequent cache misses, which will be incurred during this stabilization period by moving to the adjacent memory region seamlessly on hitting the boundary of the current memory region.

In another embodiment, a System on Chip (SoC) includes multiple functional hardware units and shared level-two (L2) cache memory coupled to the plurality of functional units. One or more of the functional units include L2 hardware prefetcher coupled to a L2 pipeline. The L2 hardware prefetcher is operative to receive from the L2 pipeline incoming requests and track a plurality of streams in a stream table with stream entries, each stream entry to track a different memory region of the predefined size. The L2 hardware prefetcher generates a prefetch request to one memory region. The L2 hardware prefetcher determines whether the prefetch request goes beyond a page boundary of the one memory region and creates a new stream entry in the stream table to track a successive memory region when the prefetch request goes beyond the page boundary of the one memory region. The L2 hardware prefetcher generates a subsequent prefetch request to the successive memory region.

FIG. 1 is a block diagram illustrating a computing system 100 that implements a hardware prefetcher 105 for prefetching larger pages according to one embodiment. The computing system 100 is formed with a processor 102 that includes one or more execution units 108 to execute an instruction and a hardware prefetcher 105 that implements one or more features in accordance with one or more embodiments as described herein.

In a further embodiment, the processor 102 includes an instruction fetch unit 103 to fetch instructions for one or more applications executed by the processor 102. In another embodiment, the instruction fetch unit 103 fetches instructions for multiple applications executing in a multitasking environment. These applications may be executing in parallel to an untrusted operating system or application stack. The hardware prefetcher 105 can be used to prefetch instructions, as well as prefetch data, stored in memory 120. Details regarding the operation of the hardware prefetcher 105 are described in more detail with respect to FIGS. 2-4B.

Computing system 100 includes a component, such as a processor 102 to employ execution units including logic to perform algorithms for processing data, in accordance with the embodiment described herein. System 100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 102 includes one or more execution units 108 to implement an algorithm that is to perform at least one instruction. One embodiment may be described in the context of a single processor desktop or server system, but alternative embodiments may be included in a multiprocessor system. System 100 may be an example of a 'hub' system architecture. The computer system 100 includes a processor 102 to process data signals. The processor 102, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that transmits data signals between the processor 102 and other components in the system 100. The computing system 100 may include various elements inside or outside the processor 102, such as graphics accelerator, memory controller hub, memory, I/O controller hub, wireless transceiver, Flash BIOS, Network controller, Audio controller, Serial expansion port, I/O controller, or the like, that perform their respective functions that are well known to those familiar with the art.

In one embodiment, the processor 102 includes a Level 2 (L2) internal cache memory 104. Depending on the architecture, the processor 102 may have a single internal cache or multiple levels of internal caches. Other embodiments include a combination of both internal and external caches depending on the particular implementation and needs. Register file 106 is to store different types of data in various registers including integer registers, floating point registers, vector registers, banked registers, shadow registers, checkpoint registers, status registers, and instruction pointer register.

Execution unit 108, including logic to perform integer and floating point operations, also resides in the processor 102. It should be noted that the execution unit may or may not have a floating point unit. The processor 102, in one embodiment, includes a microcode (ucode) ROM to store microcode, which when executed, is to perform algorithms for certain macroinstructions or handle complex scenarios. Here, microcode is potentially updateable to handle logic bugs/fixes for processor 102.

Alternate embodiments of an execution unit 108 may also be used in micro controllers, embedded processors, graphics devices, DSPs, and other types of logic circuits. System 100 includes a memory 120. Memory 120 includes a dynamic random access memory (DRAM) device, a static random access memory (SRAM) device, flash memory device, or other memory device. Memory 120 stores instructions and/or data represented by data signals that are to be executed by the processor 102. The processor 102 is coupled to the memory 120 via a processor bus 110. A system logic chip, such as a memory controller hub (MCH) may be coupled to the processor bus 110 and memory 120. An MCH can provide a high bandwidth memory path to memory 120 for instruction and data storage and for storage of graphics commands, data and textures. The MCH can be used to direct data signals between the processor 102, memory 120, and other components in the system 100 and to bridge the data signals between processor bus 110, memory 120, and system I/O, for example. The MCH may be coupled to memory 120 through a memory interface. In some embodiments, the system logic chip can provide a graphics port for coupling to a graphics controller through an Accelerated Graphics Port (AGP) interconnect. The system 100 may also include an I/O controller hub (ICH). The ICH can provide direct connections to some I/O devices via a local I/O bus. The local I/O bus is a high-speed I/O bus for connecting peripherals to the memory 120, chipset, and processor 102. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

For another embodiment of a system, the hardware prefetcher 105 can be implemented in a system on a chip. One embodiment of a system on a chip includes a processor and a memory. The memory for one such system is a flash memory. The flash memory can be located on the same die as the processor and other system components. Additionally, other logic blocks such as a memory controller or graphics controller can also be located on a system on a chip.

Figure 2:
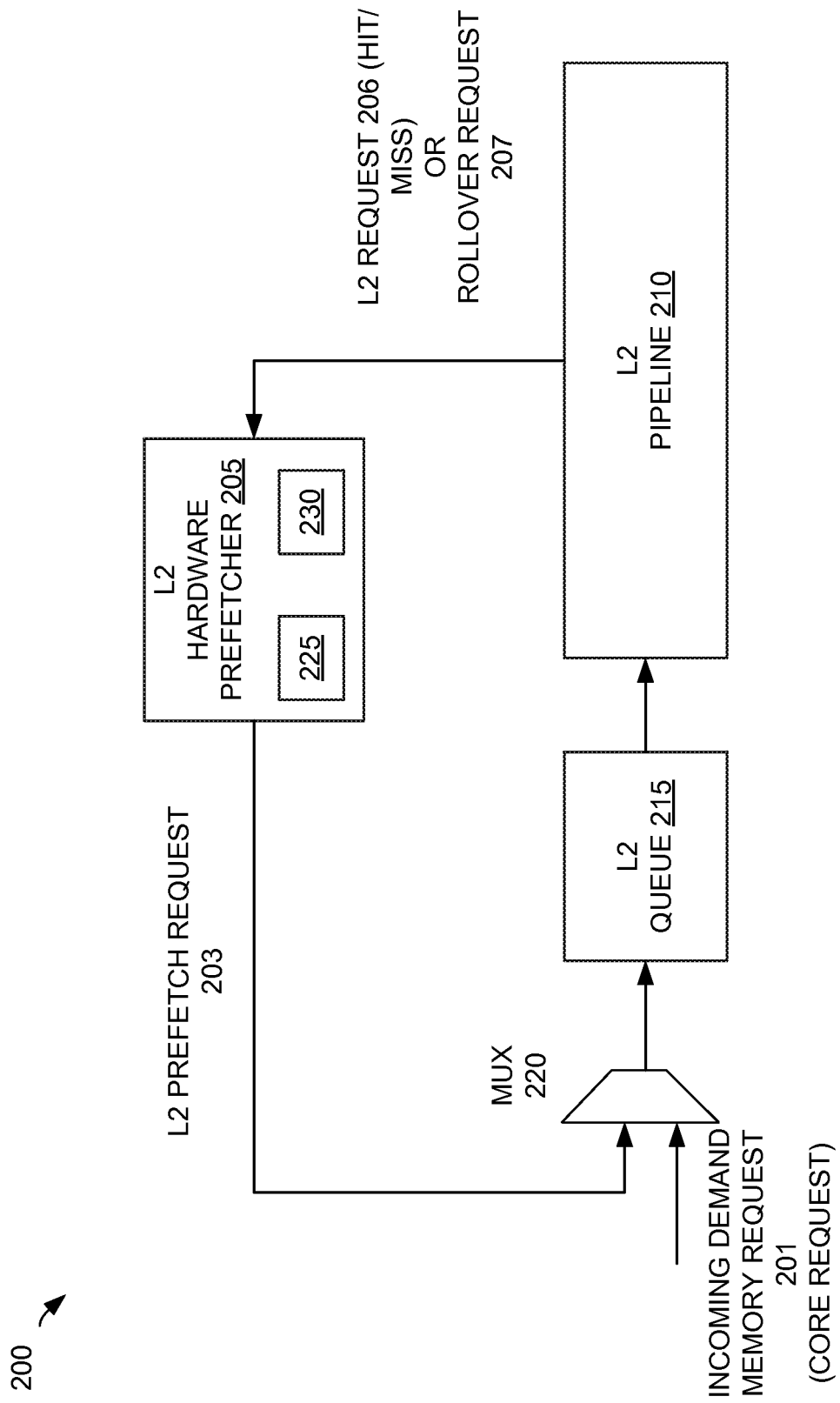
FIG. 2 is a block diagram illustrating a hardware prefetcher for prefetching larger pages than a predefined size defined by software according to one embodiment.

FIG. 2 is a block diagram illustrating a hardware prefetcher 205 for prefetching larger pages than a predefined size according to one embodiment. The hardware prefetcher 205 is a region-based hardware prefetcher that tracks memory regions of a predefined region size. The predefined region size can be defined by software executed by the processor, such as an operating system. The hardware prefetcher 205 is operative to "roll over" to a successive memory region (e.g., next 4 KB region) while tracking accesses at a tracking granularity of the predefined region size. That is, the hardware prefetch 205 does not stop issuing prefetch requests for a successive memory region when a page boundary of a current memory region is reached. The hardware prefetcher 205 permits an original hardware prefetcher design to be used, but the hardware prefetcher 205 is able to issue useful prefetch requests from the successive memory region ahead of time, as compared to conventional hardware prefetchers that wait for a demand request for the successive memory region. The hardware prefetcher 205 with the "rollover" support gains performance as a result of not waiting for the demand request. Of course, other increases may be achieved based on various factors of the implementation.

FIG. 2 illustrates an example of an L2 hardware prefetcher 205 that is used in connection with a L2 cache memory and an L2 pipeline 210. The operations of the L2 hardware prefetcher 205 are described with and without "rollover" support for ease of description. It should also be noted that the hardware prefetcher technology described herein can be used at any cache level, or any combination of cache levels.

The following examples assume that the L2 hardware prefetcher 205 has a tracking granularity of 4 KB a page size of 4 KB and can support larger page sizes of 2 MB. The page size defined by the software (e.g., operating system) can be 4 KB, being equal to the tracking granularity.

During operation of the L2 hardware prefetcher (L2HWP) 205 without rollover support, the L2HWP 205 tracks multiple streams (each in a different 4 KB region) in a stream table. For each stream, the tracking entry maintains the following information: 1) Page offset/Tracking region offset, which indicates what is the index of the tracking region to be tracked in the memory address space, i.e., simply, address of the first byte of the tracking region and tracking region size; 2) Home line (HL), which refers to the address of the next line to be prefetched; 3) Direction, which indicates whether to prefetch in the forward direction or the backward direction; and 4) Page size of the tracking region: This is different from the tracking region itself which is always 4 KB, but indicates whether the tracking region has been mapped to a 4 KB page by the operating system (OS), or to a larger page (2 MB as in this example). This information may be conveyed to the L2HWP 205 by the L1 cache/TLB or the like. An incoming demand memory request 201 for the L2 cache is fed into the L2HWP 205 by the L2 pipeline 210, such as by an L2 cache controller. The L2HWP 205 receies L2 request hit/miss 205. The incoming demand memory requests 201 can be core requests from the processor core, for example. If the incoming demand memory request 201 matches an existing stream entry in the L2HWP 205, some updates may be done to the corresponding stream entry. If there is no match in the stream table, a new entry is created for that memory region to which an address of the incoming demand memory request 201 belongs. The direction in the stream entry can also be set to "searching." The L2HWP 205 waits for a few more demand memory accesses 201 (e.g., one or two more demand memory requests) to this 4 KB region in order to determine a stable direction of movement for the access pattern. At this point, the stream entry is marked as a valid candidate from which to issue prefetch requests. A prefetch generation engine 225 may walk through the stream tracking table in a round-robin fashion, picking a stream with outstanding prefetch requests to be issued and generating a prefetch request for this entry. The address to be prefetched is the HL stored in the entry. The HL is then advanced to the next line in the forward or backward direction as noted in the stream entry. If the page offset of the address to be prefetched falls off the page boundary—i.e., is less than 0 or greater than PAGE_SIZE (the last line in the 4 KB region), the stream entry is invalidated and no prefetch is issued. As described below, a prefetch request 203 is generated by the prefetch generation engine 225 when there is rollover support, and the prefetch request 203 is sent to a L2 queue 215 (L2Q), from where it enters the L2 pipeline 210. It should be noted that in the usual case without rollover support, prefetcher requests are not fed back into the L2 hardware prefetcher, only the incoming core demand requests are fed.

With the rollover support, if the page offset of the address to be prefetched falls off the page boundary, i.e., is less than 0 or greater then PAGE_SIZE, a prefetch request 203 is generated by prefetch generation engine 225 when the Page Size corresponding to the entry was indicative of a large page (2 MB in this example). The stream entry may still be invalidated as before, since this prefetch address obviously falls into the successive 4 KB region (e.g., next 4 KB region or previous 4 KB region). This special rollover prefetch request 203 (referred to as a "rollover request" 207) is marked so that it is fed back into the L2HWP 205 by the L2 pipeline 210. The direction bit, stride value and possibly other relevant details as needed by the hardware prefetching algorithm may also be encoded in the rollover request 207. When the L2HWP 205 receives the rollover request 207 from the L2 pipeline 210 (instead of the L2 request hit/miss 205), the L2HWP 205 creates a new stream entry corresponding to the next 4 KB region to which the address of rollover request belongs. Because the rollover request includes the direction and other needed details, the rollover request can operate to stabilize that table entry immediatley, instead of waiting for a few accesses to that memory region to infer details like direction, and start generating prefetch requests from that memory region. This permits each prefetch stream being tracked to support larger pages, allowing each prefetch stream to seamlessly move across large page sizes. The rollover support can result in large improvement in performance of certain relevant workloads for processor cores. In another implementation, the L2HWP 205 can simply reuse the same stream entry to track the next region (to which a rollover request is being sent), assuming no such stream entry which tracks this next region already exists, without actually going through the explicit mechanism of generating, sending a rollover request, reading the roller request and then creating a new stream entry.

It should be noted that only core requests are fed into a traditional prefetcher, whereas, the core requests and the special type of request, namely the rollover requests 207 also need to be fed into the L2HWP 205. It should also be noted that various embodiments of the hardware prefetcher with rollover support can also support strides. Strides is a feature where the stride of the stream can be tracked, telling the hardware prefetcher an offset of the next line to be prefetched from the current line being prefetched. In the case where strides are not supported, the stride can be set to one where the next sequential cache line is prefetched. The hardware prefetcher with rollover and stride support can be used to benefit applications which access memory in strides, like every fourth cache line. In some embodiments, the rollover request can be populated with stride information, such as information to indicate that strides is supported and information to indicate a stride length to be used. This information can be populated in a stride field in the rollover request. When the rollover request is fed back into the hardware prefetcher from the L2 pipeline, the hardware prefetcher can set the stream entry to have the correct stride value based on the stride field.

In one embodiment, the L2 hardware prefetcher 205 coupled to a processor core (not illustrated in FIG. 2) and an L2 cache memory (not illustrated in FIG. 2). The L2 hardware prefetcher 205 tracks memory regions of a predefined region size that is defined by software to be executed by the processor. During operation, the L2 hardware prefetcher 205 receives from the L2 pipeline 210 incoming requests (205 or 207). The L2 hardware prefetcher 205 tracks multiple streams in a stream table with stream entries, each stream entry to track a different memory region of the predefined size. The L2 hardware prefetcher 205 generates a prefetch request 203 to one memory region and the L2 hardware prefetcher 205 determines whether the prefetch request goes beyond a page boundary of the one memory region. The L2 hardware prefetcher 205 creates a new stream entry in the stream table to track a successive memory region when the prefetch request goes beyond the page boundary of the one memory region and generates a subsequent prefetch request to the successive memory region. In a further embodiment, the L2 hardware prefetcher 205 tracks the multiple streams with the stream entries and a new stream with the new stream entry.

The stream entries and the new stream entry may include a tracking region offset that indicates an index of a tracking region to be tracked in a memory address space; a HL to refer to an address of a next line to be prefetched; a direction indicator to indicate whether to prefetch in a forward direction or a backward direction; and a page size of the tracking region to indicate whether the tracking region is mapped to a page of the predefined size or to a larger page that is greater than the predefined size. In one embodiment, the tracking region offset is a first byte of the tracking region and a tracking region size is equal to the predefined size.

In a further embodiment, a cache queue, such as L2 queue 215 is coupled to the L2 pipeline 210. The cache queue 215 is to store the incoming demand memory requests 201, prefetch requests 203 (the original prefetch requests and the subsequent prefetch requests for the new streams). In a further embodiment, a multiplexer 220 is coupled to receive the prefetch requests 203 from the L2 hardware prefetcher 205 and incoming demand memory requests 201 from the processor core. The incoming demand memory requests 201 can indicate to the L2HWP 205 whether the request belongs to a predefined-size page (e.g., 4 KB page) or a larger-sized page (e.g., 2 MB page). This information can be used by the L2HWP 205 to decide whether to generate a rollover request from the stream. By knowing the page size for a stream, the L2HWP 205 can use this information for security privileged as described herein. As described herein, the hardware prefetcher, both with and without large page support, tracks granularity of a stream according to the page size, typically 4 KB. The hardware prefetcher with rollover support enables the hardware prefetcher to move to the next page seamlessly.

In a further embodiment, the L2 hardware prefetcher 205 determines whether a tracking region offset of the prefetch request is less than zero to determine whether the prefetch request goes beyond the page boundary of the one memory region. In another embodiment, the L2 hardware prefetcher 205 determines whether a tracking region offset of the prefetch request is greater than the predefined size to determine whether the prefetch request goes beyond the page boundary of the one memory region.

In another embodiment, the L2 hardware prefetcher 205 determines whether the incoming requests 205 received are rollover requests 207 or regular request hits/misses 205. The L2 hardware prefetcher 205 determines whether there is a page hit in the stream table when the incoming request is a rollover request 207. The new stream entry is created when there is no page hit in the stream table and the rollover request is dropped when there is a page hit. The L2 hardware prefetcher 205 continues with non-rollover prefetching (e.g., baseline prefetcher behavior described above) when the incoming request is not a rollover request 205 (is a request 205). The L2 hardware prefetcher 205 selects a stream entry from the stream table to generate a next prefetch request and determines whether the address of the next prefetch request crosses the page boundary (e.g., 4 KB page boundary) of the region tracked by the stream entry. The L2 hardware prefetcher 205 determines whether the address of the next prefetch request crosses a larger page boundary (e.g., 2 MB page boundary) when the address crosses the page boundary of the region tracked by the stream entry. The L2 hardware prefetcher 205 continue with non-rollover prefetching (e.g., baseline prefetching behavior) when the address does not cross the page boundary of the region tracked by the stream entry. The L2 hardware prefetcher 205 generates a new rollover request (203) when the address crosses the page boundary of the region tracked by the stream entry and does not cross the larger page boundary. The L2 hardware prefetcher 205 drops the next prefetch request and invalidates the stream entry when the next prefetch request crosses the larger page boundary.

As noted above, although FIG. 2 illustrates and describes L2 cache queue 215, L2 pipeline 210, and L2 hardware prefetcher 205, in other embodiments, the hardware prefetcher with rollover support can be used in other levels of cache memory.

In some embodiments, the tracking granularity size is equal to the predefined size (also considered a region granularity) of the memory regions as defined by software. In other embodiments, the tracking granularity size and the predefined size may be different.

Figure 3A:
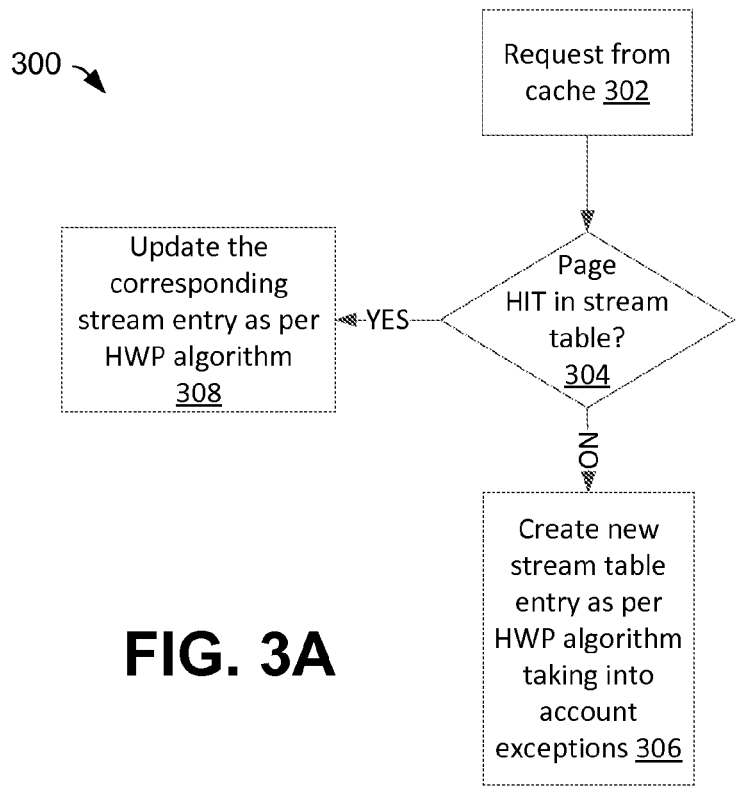
FIG. 3A is a flow diagram illustrating a method of handling incoming requests in a hardware prefetcher without operating a hardware prefetcher for prefetching with non-rollover behavior according to one embodiment.

FIG. 3A is a flow diagram illustrating a method 300 of handling incoming requests in a hardware prefetcher without operating a hardware prefetcher for prefetching with non-rollover behavior according to one embodiment. Method 300 may be performed by processing logic that may comprise hardware (e.g., circuitry, dedicated logic, programmable logic, microcode, etc.), software (such as instructions running on the processor), firmware or a combination thereof. In one embodiment, the hardware prefetcher 105 of FIG. 1 performs the method 300. In another embodiment, the hardware prefetcher 205 of FIG. 2 performs the method 300. Alternatively, other components of the computing system 100 of FIG. 1 or the processor described with respect to FIG. 2 may perform some or all of the operations of the method 300.

Referring to FIG. 3A, the method 300 begins by the processing logic receiving a core request from cache (block 302). The processing logic determines whether there is a page hit in a stream table (block 304). When there is no page hit in the stream table at block 304, the processing logic creates a new stream table entry in the stream table per the hardware prefetcher algorithm, taking into account exceptions (block 306). When there is a page hit in the stream table at block 304, the processing logic updates the corresponding stream entry as per the hardware prefetcher algorithm (block 308).

Figure 3B:
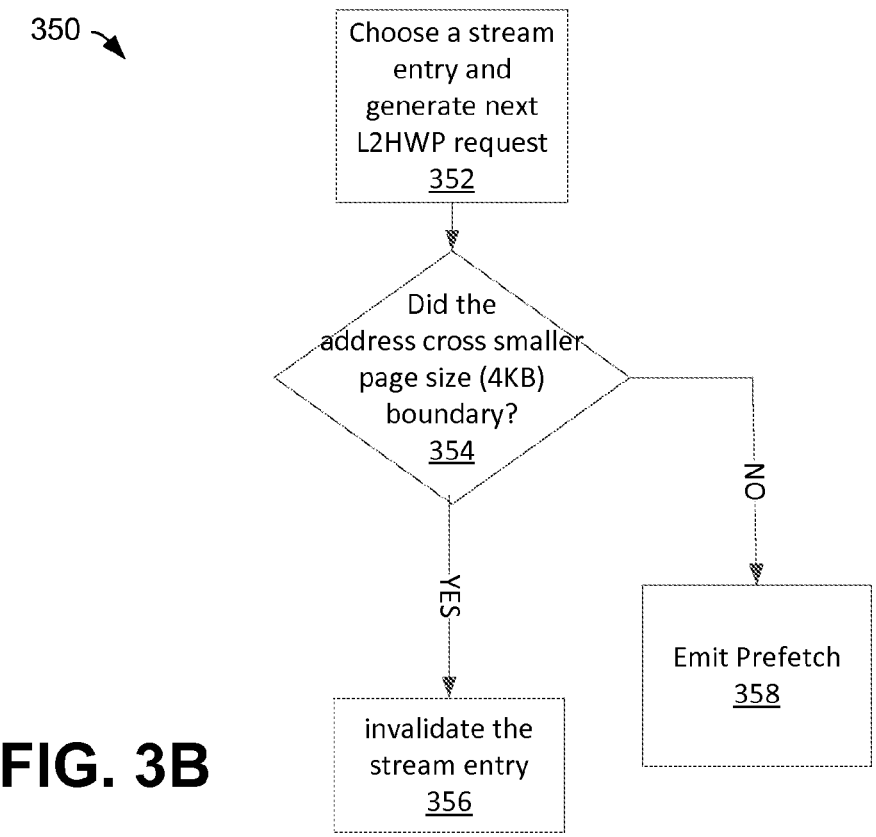
FIG. 3B is a flow diagram illustrate a method of generating prefetch request in a hardware prefetcher prefetching with non-rollover behavior according to one embodiment.

FIG. 3B is a flow diagram illustrate a method 350 of generating prefetch request in a hardware prefetcher prefetching with non-rollover behavior according to one embodiment. Method 350 may be performed by processing logic that may comprise hardware (e.g., circuitry, dedicated logic, programmable logic, microcode, etc.), software (such as instructions running on the processor), firmware or a combination thereof. In one embodiment, the hardware prefetcher 105 of FIG. 1 performs the method 350. In another embodiment, the hardware prefetcher 205 of FIG. 2 performs the method 350. Alternatively, other components of the computing system 100 of FIG. 1 or the processor described with respect to FIG. 2 may perform some or all of the operations of the method 350.

Referring to FIG. 3B, the method 350 begins by the processing logic selecting a stream entry from the stream table to generate a next prefetch request (block 352). The processing logic determines whether an address of the next prefetch request crosses the page boundary of the tracked memory region (block 354). When the address crosses the page boundary (e.g., 4 KB) of the tracked memory region, the processing logic invalidates the stream entry (block 356). When the address does not cross the page boundary, the processing logic emits the prefetch request (block 358).

Figure 4A:
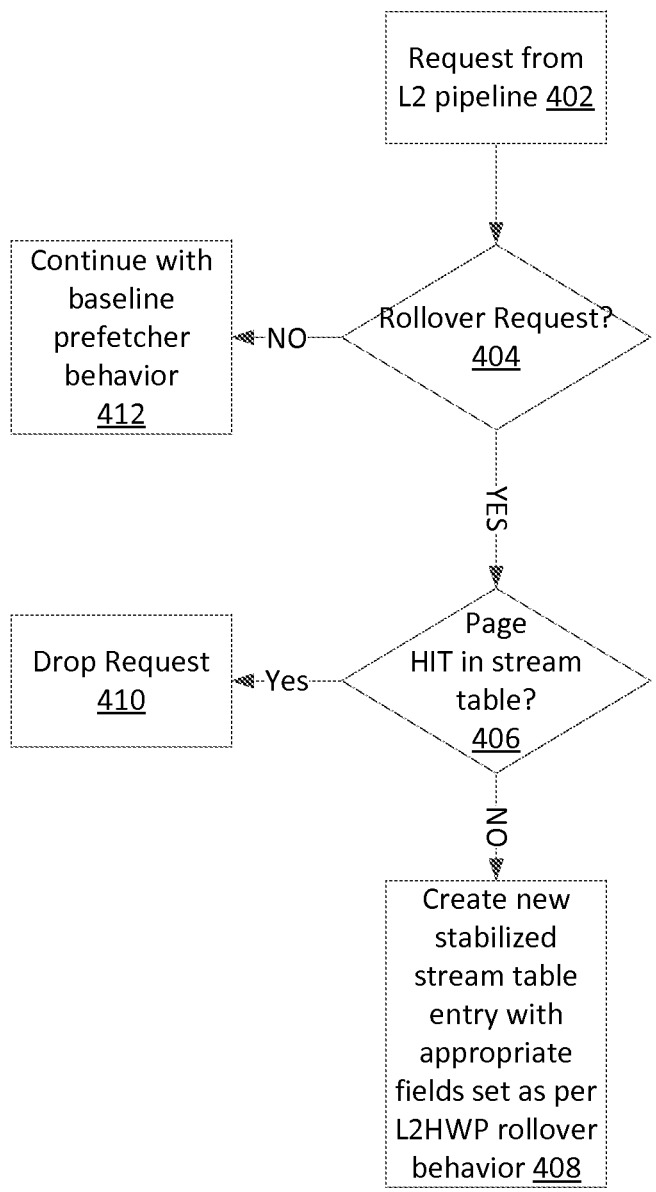
FIG. 4A is a flow diagram illustrating a method of handling incoming requests in a L2 hardware prefetcher according to one embodiment.

FIG. 4A is a flow diagram illustrating a method 400 of handling incoming requests in a L2 hardware prefetcher according to one embodiment. Method 400 may be performed by processing logic that may comprise hardware (e.g., circuitry, dedicated logic, programmable logic, microcode, etc.), software (such as instructions running on the processor), firmware or a combination thereof. In one embodiment, the hardware prefetcher 105 of FIG. 1 performs the method 400. In another embodiment, the hardware prefetcher 205 of FIG. 2 performs the method 400. Alternatively, other components of the computing system 100 of FIG. 1 or the processor described with respect to FIG. 2 may perform some or all of the operations of the method 400.

Referring to FIG. 4A, the method 400 begins by the processing logic receiving a request from a cache controller (or another component of a pipeline) (block 402). The processing logic determines whether the incoming requests are rollover requests (block 404). The processing logic determines whether there is a page hit in the stream table when the incoming request is a rollover request (block 406). The processing logic creates a new stabilized stream entry in the stream table with appropriate fields set as per L2HWP behavior, as described herein, when there is no page hit in the stream table (block 408). The processing logic drops the rollover request when there is a page hit (block 410). The processing logic continues with non-rollover prefetching (baseline prefetcher behavior) when the incoming request is not a rollover request (block 412).

Figure 4B:
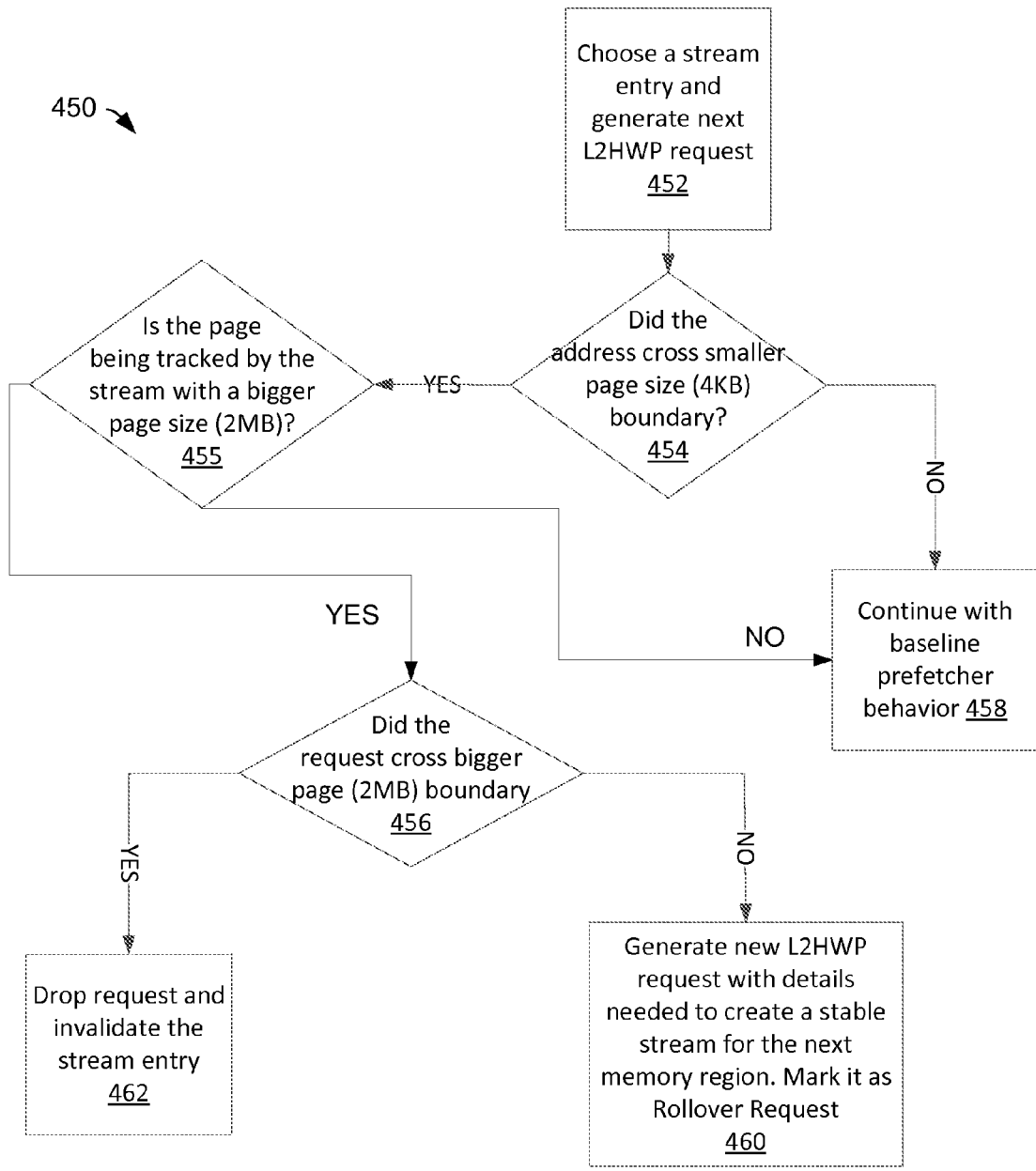
FIG. 4B is a flow diagram illustrating a method of generating prefetch requests in a L2 hardware prefetcher according to one embodiment.

FIG. 4B is a flow diagram illustrating a method 450 of generating prefetch requests in a L2 hardware prefetcher according to one embodiment. Method 450 may be performed by processing logic that may comprise hardware (e.g., circuitry, dedicated logic, programmable logic, microcode, etc.), software (such as instructions running on the processor), firmware or a combination thereof. In one embodiment, the hardware prefetcher 105 of FIG. 1 performs the method 450. In another embodiment, the hardware prefetcher 205 of FIG. 2 performs the method 450. Alternatively, other components of the computing system 100 of FIG. 1 or the processor described with respect to FIG. 2 may perform some or all of the operations of the method 450.

Referring to FIG. 4B, the method 450 begins by the processing logic selecting a stream entry from the stream table to generate a next prefetch request (block 452). The processing logic determines whether an address of the next prefetch request crosses the page boundary of the memory region being tracked (block 454). The processing logic continues with non-rollover prefetching when the address does not cross the page boundary of the tracked memory region at block 454 (block 458). When the address crosses the page boundary of the tracked memory region at block 454, the processing logic determines if the region being tracked by the stream entry is part of a bigger page size (e.g., 2 MB) (block 454), which would have been identified as such by the incoming memory demand request that created this stream entry (block 456). When the processing logic determines that the request does not crosses the bigger page boundary at block 456, the processing logic generates a new request with details needed to create a stable stream for the next memory region and marks the new request as a rollover request (block 460). The processing logic drops the next prefetch request and invalidates the stream entry when the next prefetch request crosses the larger page boundary (block 462).

Figure 5A:
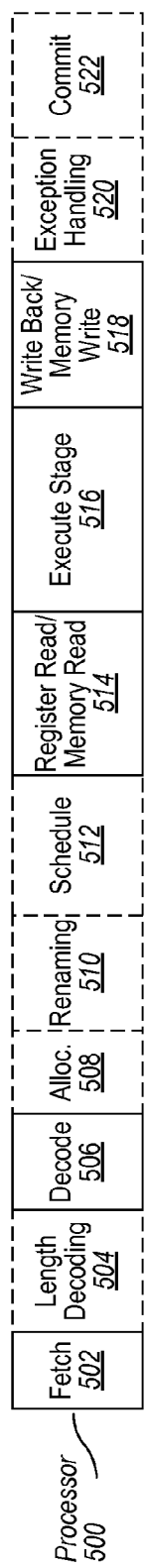
FIG. 5A is a block diagram illustrating an in-order pipeline and a register renaming stage, out-of-order issue/execution pipeline according to one embodiment.

FIG. 5A is a block diagram illustrating a micro-architecture for a processor 500 that implements a hardware prefetcher for prefetching larger pages according to one embodiment. Specifically, processor 500 depicts an in-order architecture core and a register renaming logic, out-of-order issue/execution logic to be included in a processor according to at least one embodiment of the disclosure.

Processor 500 includes a front-end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or another alternative core type. As yet another option, processor 500 may include a special-purpose core, such as, for example, a network or communication core, compression engine, graphics core, or the like. In one embodiment, processor 500 may be a multi-core processor or may be part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 560. The decode unit 560 (also known as a decoder) may decode instructions, and generate as an output one or more micro-operations, micro-code entry points, microinstructions, other instructions, or other control signals, which are decoded from, or which otherwise reflect, or are derived from, the original instructions. The decode unit 560 may be implemented using various different mechanisms. Examples of suitable mechanisms include, but are not limited to, look-up tables, hardware implementations, programmable logic arrays (PLAs), microcode stores, such as microcode read only memories (ROMs), etc. The instruction cache unit 534 is further coupled to the memory unit 570. The decode unit 560 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc.

The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5B:
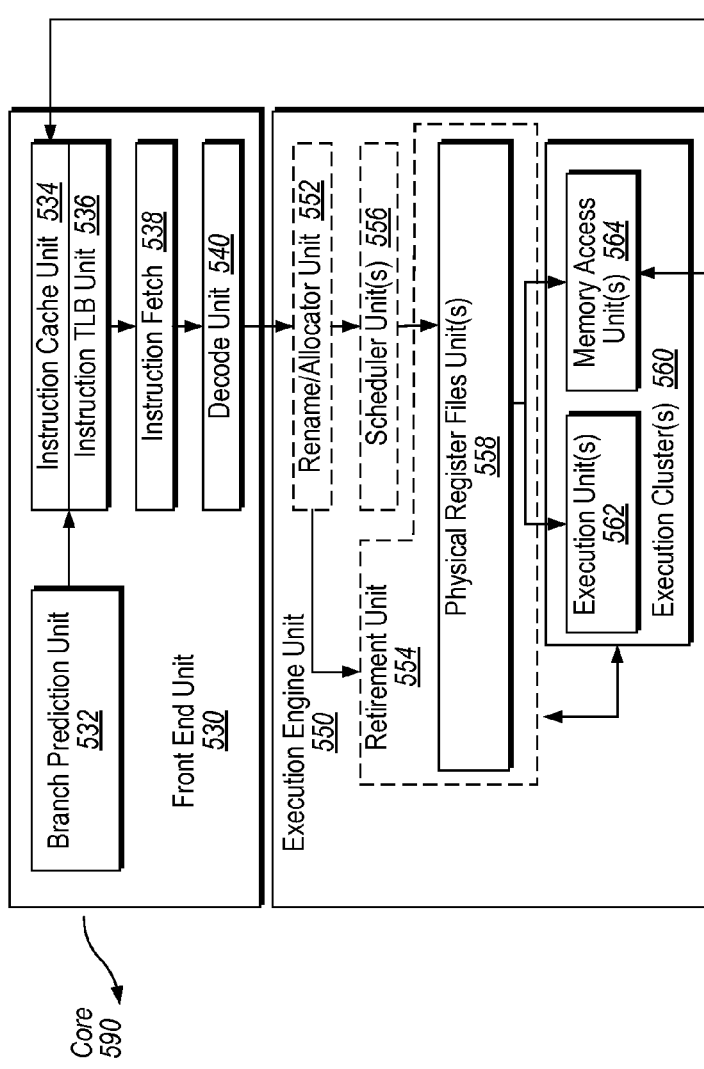
FIG. 5B is a block diagram illustrating a micro-architecture for a processor that implements a hardware prefetcher for prefetching larger pages according to one embodiment.

FIG. 5B is a block diagram illustrating an in-order pipeline and a register renaming stage, out-of-order issue/execution pipeline implemented by processing device 500 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

Figure 6:
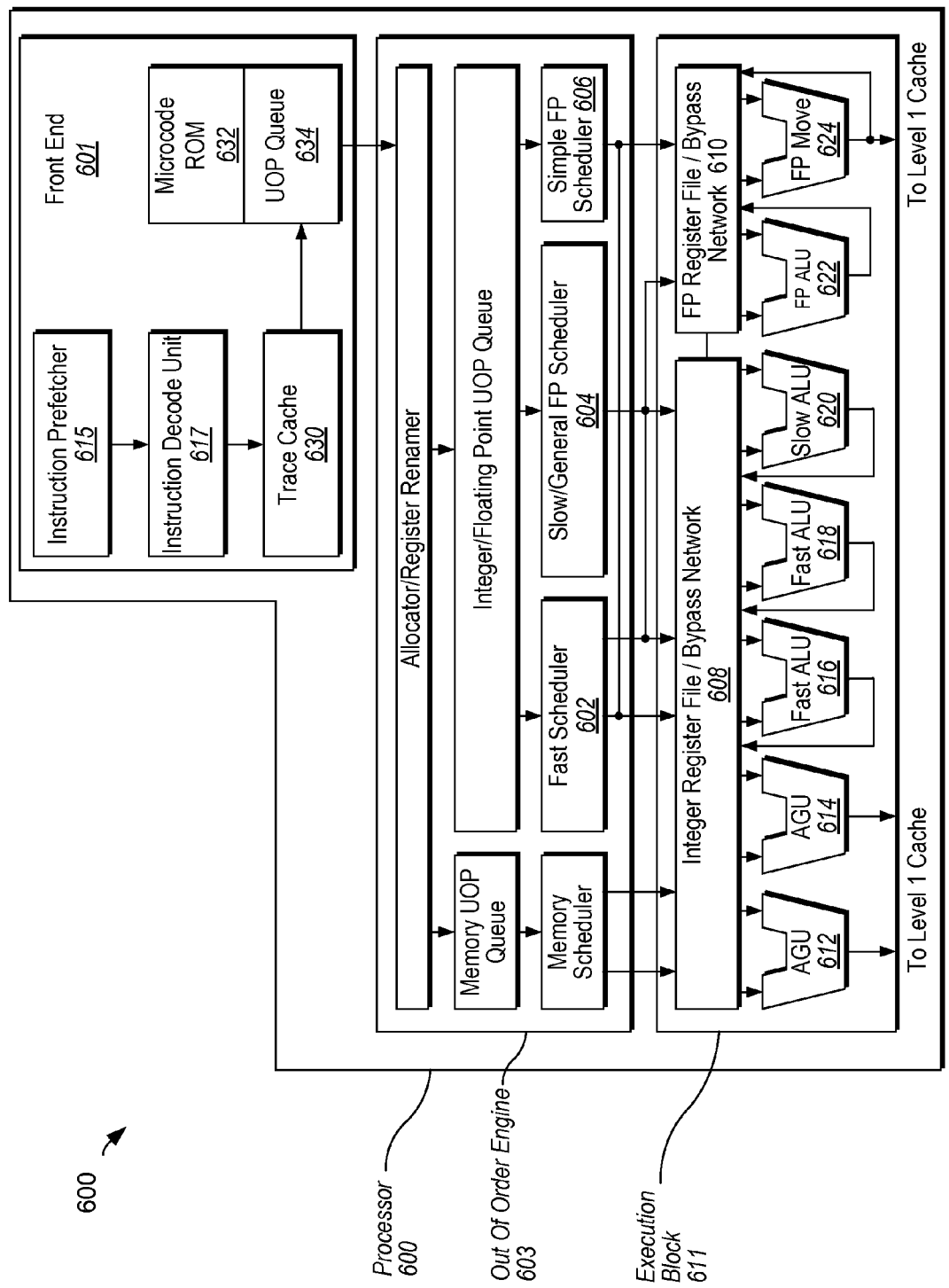
FIG. 6 illustrates a block diagram of the micro-architecture for a processor that includes logic circuits to implement a hardware prefetcher for prefetching larger pages according to one embodiment.

FIG. 6 illustrates a block diagram of the micro-architecture for a processor 600 that includes logic circuits to implement a hardware prefetcher for prefetching larger pages according to one embodiment. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 616 fetches instructions from memory and feeds them to an instruction decode unit 618, which in turn decodes or interprets them. The instruction prefetcher 616 is the hardware prefetcher with rollover support described herein. For example, in one embodiment, the decode unit 618 decodes a received instruction into one or more operations called "microinstructions" or "micro-operations" (also called micro op or μops) that the machine can execute. In other embodiments, the decode unit parses the instruction into an opcode and corresponding data and control fields that are used by the micro-architecture to perform operations in accordance with one embodiment. In one embodiment, the trace cache 620 takes decoded μops and assembles them into program ordered sequences or traces in the μops queue 634 for execution. When the trace cache 620 encounters a complex instruction, the microcode ROM 632 provides the μops needed to complete the operation.

Some instructions are converted into a single micro-op, whereas others need several micro-ops to complete the full operation. In one embodiment, if more than four micro-ops are needed to complete an instruction, the decode unit 618 accesses the microcode ROM 632 to do the instruction. For one embodiment, an instruction can be decoded into a small number of micro ops for processing at the instruction decode unit 618. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the microcode ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each μop needs in order to execute. The register renaming logic renames logic registers onto entries in a register file. The allocator also allocates an entry for each μop in one of the two μop queues, one for memory operations and one for non-memory operations, in front of the instruction schedulers: memory scheduler, fast scheduler 602, slow/general floating point scheduler 604, and simple floating point scheduler 606. The μop schedulers 602, 604, 606, determine when a μop is ready to execute based on the readiness of their dependent input register operand sources and the availability of the execution resources the μops need to complete their operation. The fast scheduler 602 of one embodiment can schedule on each half of the main clock cycle while the other schedulers can only schedule once per main processor clock cycle. The schedulers arbitrate for the dispatch ports to schedule μops for execution.

Register files 608, 610, sit between the schedulers 602, 604, 606, and the execution units 612, 614, 616, 618, 610, 612, 614 in the execution block 611. There is a separate register file 608, 610, for integer and floating point operations, respectively. Each register file 608, 610, of one embodiment also includes a bypass network that can bypass or forward just completed results that have not yet been written into the register file to new dependent μops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 610, 612, 614, where the instructions are actually executed. This section includes the register files 608, 610, which store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 610, floating point ALU 612, floating point move unit 614. For one embodiment, the floating point execution blocks 612, 614, execute floating point, MMX, SIMD, and SSE, or other operations. The floating point ALU 612 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 610 as the slow ALU 610 includes integer execution hardware for long latency type of operations, such as a multiplier, shifts, flag logic, and branch processing. The AGUs 612, 614 executes memory load/store operations. For one embodiment, the integer ALUs 616, 618, 610, are described in the context of performing integer operations on 64 bit data operands. In alternative embodiments, the ALUs 616, 618, 610, can be implemented to support a variety of data bits including 16, 32, 128, 256, etc. Similarly, the floating point units 612, 614, can be implemented to support a range of operands having bits of various widths. For one embodiment, the floating point units 612, 614, can operate on 128 bits wide packed data operands in conjunction with SIMD and multimedia instructions.

In one embodiment, the μops schedulers 602, 604, 606, dispatch dependent operations before the parent load has finished executing. As μops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations. The processor 600 also includes the firmware, microcode, or any combination thereof, as described herein. The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
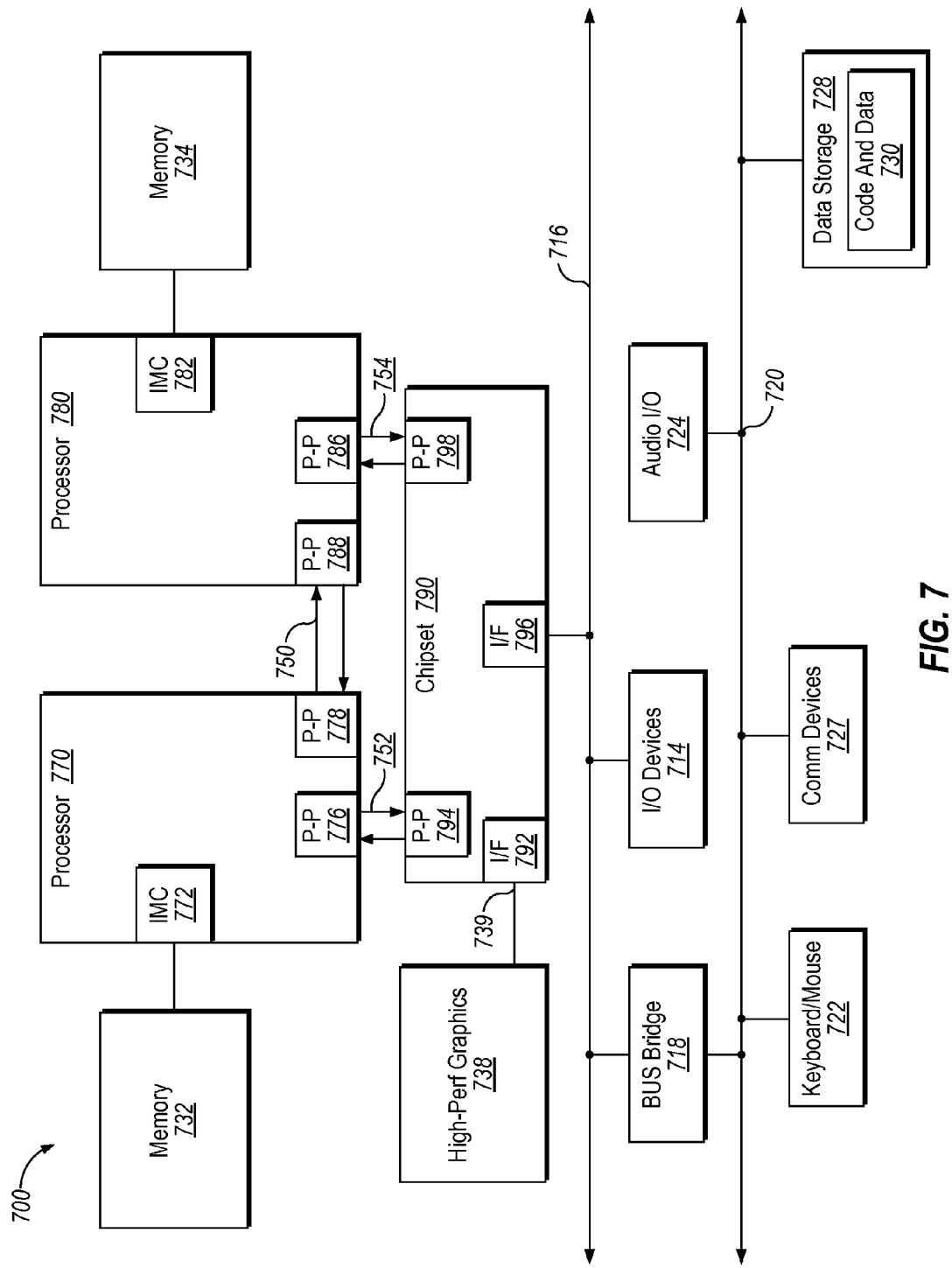
FIG. 7 is a block diagram of a computer system according to one implementation.

Embodiments may be implemented in many different system types. Referring now to FIG. 7, shown is a block diagram of a multiprocessor system 700 in accordance with an implementation. As shown in FIG. 7, multiprocessor system 700 is a point-to-point interconnect system, including a first processor 770 and a second processor 780 coupled via a point-to-point interconnect 750. The multiprocessor system 700 may include the hardware prefetcher with rollover support as described herein. The multiprocessor system 700 also includes the firmware, microcode, or any combination thereof, as described herein. As shown in FIG. 7, each of processors 770 and 780 may be multicore processors, including first and second processor cores, although potentially many more cores may be present in the processors. The processors each may include write mode logics in accordance with an embodiment.

While shown with two processors 770, 780, it is to be understood that the scope of the present disclosure is not so limited. In other implementations, one or more additional processors may be present in a given processor.

Processors 770 and 780 are shown including integrated memory controller units 782 and 782, respectively. Processor 770 also includes as part of its bus controller units point-to-point (P-P) interfaces 776 and 788; similarly, second processor 780 includes P-P interfaces 786 and 788. Processors 770, 780 may exchange information via a point-to-point (P-P) interface 750 using P-P interface circuits 788, 788. As shown in FIG. 7, IMCs 782 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718, which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device, which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
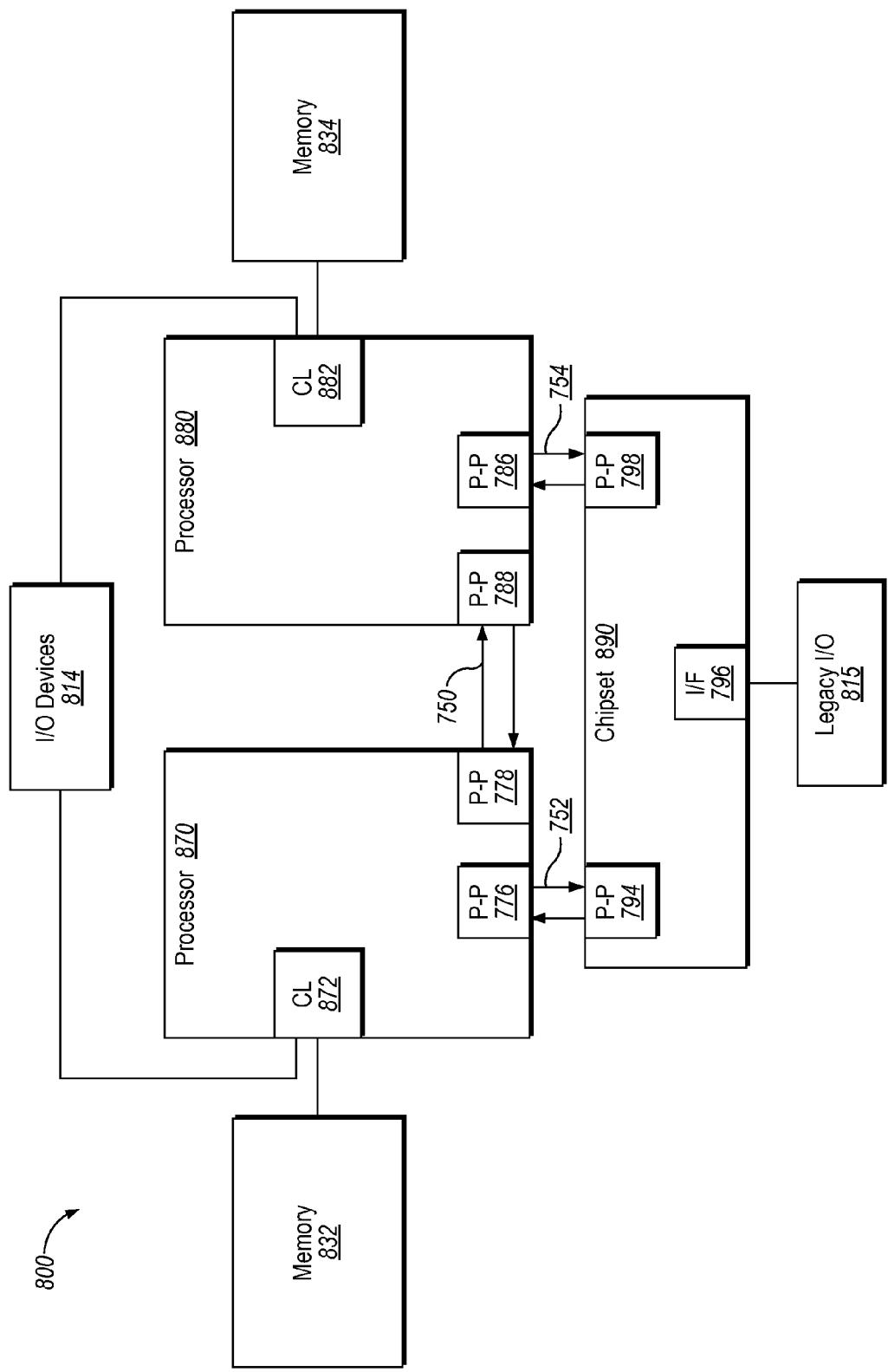
FIG. 8 is a block diagram of a computer system according to another implementation.

Referring now to FIG. 8, shown is a block diagram of a third system 800 in accordance with an embodiment of the present invention. Like elements in FIGS. 7 and 8 bear like reference numerals, and certain aspects of FIG. 7 have been omitted from FIG. 8 in order to avoid obscuring other aspects of FIG. 8.

FIG. 8 illustrates that the processors 870, 880 may include integrated memory and I/O control logic ("CL") 872 and 882, respectively. For at least one embodiment, the CL 872, 882 may include integrated memory controller units such as described herein. In addition. CL 872, 882 may also include I/O control logic. FIG. 8 illustrates that the memories 832, 834 are coupled to the CL 872, 882, and that I/O devices 814 are also coupled to the control logic 872, 882. Legacy I/O devices 815 are coupled to the chipset 890. The system 800 includes the hardware prefetcher with rollover support as described herein. The third system 800 also includes the firmware, microcode, or any combination thereof, as described herein.

Figure 9:
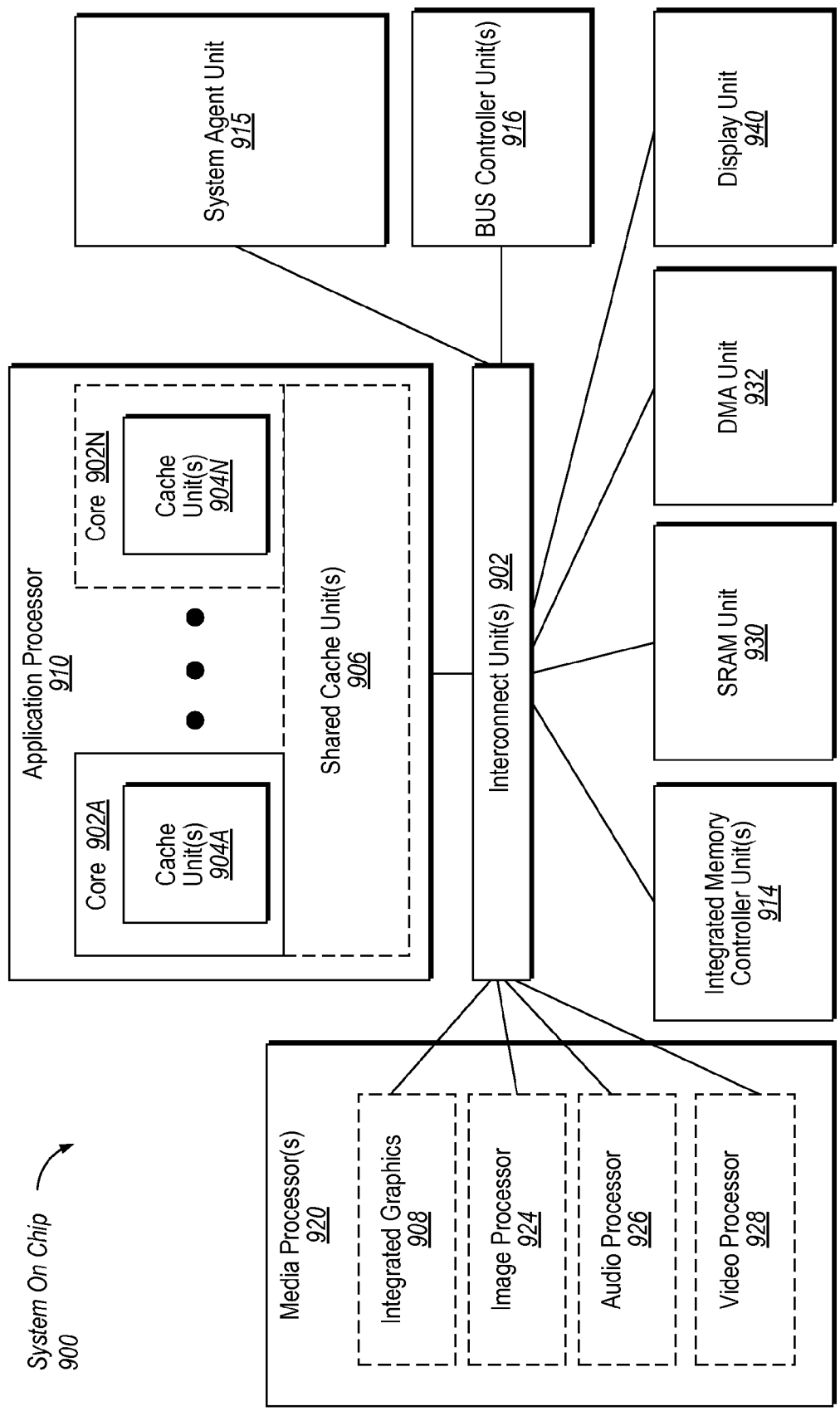
FIG. 9 is a block diagram of a system-on-a-chip according to one implementation.

FIG. 9 is an exemplary system on a chip (SoC) that may include one or more of the cores 902. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 9, shown is a block diagram of a SoC 900 in accordance with an embodiment of the present disclosure. Similar elements in FIG. 5 bear like reference numerals. Also, dashed lined boxes are features on more advanced SoCs. In FIG. 9, an interconnect unit(s) 902 is coupled to: an application processor 910 which includes a set of one or more cores 902A-N and shared cache unit(s) 906; a system agent unit 915; a bus controller unit(s) 916; an integrated memory controller unit(s) 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; a static random access memory (SRAM) unit 930; a direct memory access (DMA) unit 932; and a display unit 940 for coupling to one or more external displays. The SoC 900 includes the hardware prefetcher with rollover support as described herein. The SoC 900 also includes the firmware, microcode, or any combination thereof, as described herein.

Figure 10:
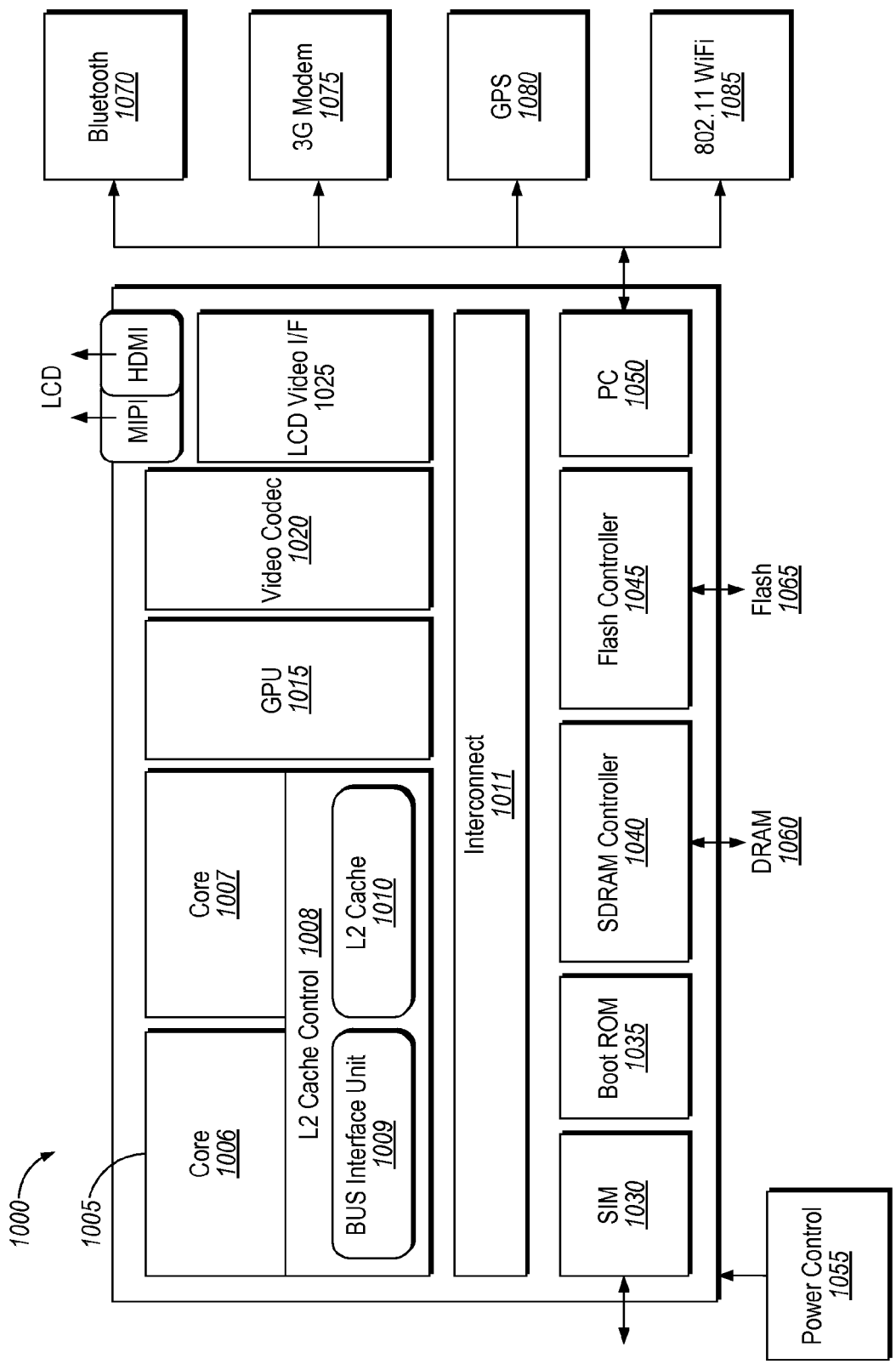
FIG. 10 illustrates another implementation of a block diagram for a computing system.

Turning next to FIG. 10, an embodiment of a system on-chip (SoC) design in accordance with embodiments of the disclosure is depicted. As an illustrative example, SoC 1000 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network.

Here, SoC 1000 includes 2 cores—1006 and 1007. Similar to the discussion above, cores 1006 and 1007 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1006 and 1007 are coupled to cache control 1008 that is associated with bus interface unit 1009 and L2 cache 1010 to communicate with other parts of system 1000. Interconnect 1011 includes an on-chip interconnect, such as an IOSF, AMBA, or other interconnects discussed above, which can implement one or more aspects of the described disclosure. The SoC 1000 includes the hardware prefetcher with rollover support as described herein.

Interconnect 1011 provides communication channels to the other components, such as a Subscriber Identity Module (SIM) 1030 to interface with a SIM card, a boot ROM 1035 to hold boot code for execution by cores 1006 and 1007 to initialize and boot SoC 1000, a SDRAM controller 1040 to interface with external memory (e.g. DRAM 1360), a flash controller 1045 to interface with non-volatile memory (e.g. Flash 1065), a peripheral control 1050 (e.g. Serial Peripheral Interface) to interface with peripherals, video codecs 1020 and Video interface 1025 to display and receive input (e.g. touch enabled input), GPU 1015 to perform graphics related computations, etc. Any of these interfaces may incorporate aspects of the embodiments described herein.

In addition, the system illustrates peripherals for communication, such as a Bluetooth module 1070, 3G modem 1075, GPS 1080, and Wi-Fi 1085. Note as stated above, a UE includes a radio for communication. As a result, these peripheral communication modules may not all be included. However, in a UE some form of a radio for external communication should be included.

Figure 11:
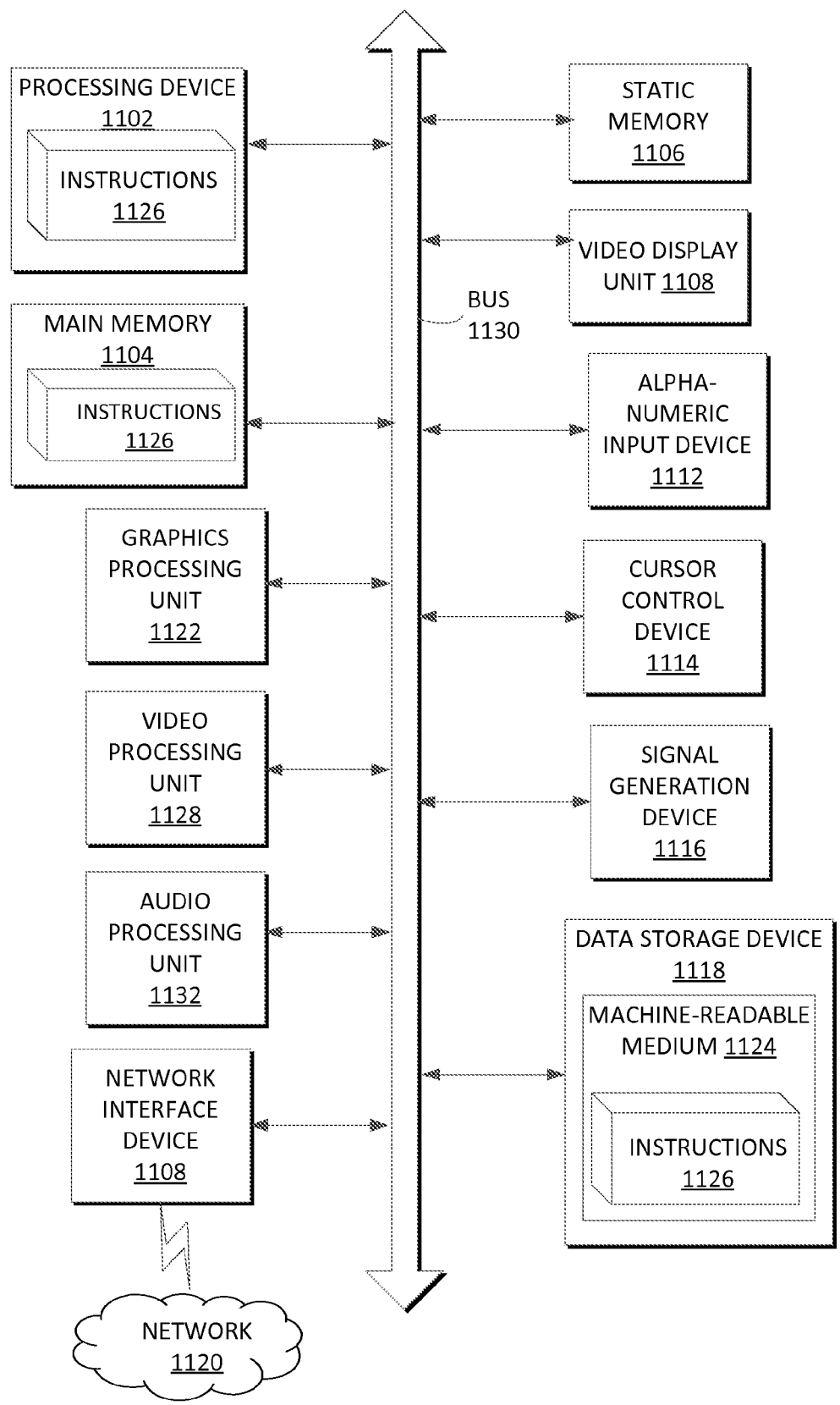
FIG. 11 illustrates another implementation of a block diagram for a computing system.

FIG. 11 illustrates a diagrammatic representation of a machine in the example form of a computing system 1100 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing system 1100 includes a processing device 1102, main memory 1104 (e.g., read-only memory (ROM), flash memory, dynamic random access memory (DRAM) (such as synchronous DRAM (SDRAM) or DRAM (RDRAM), etc.), a static memory 1106 (e.g., flash memory, static random access memory (SRAM), etc.), and a data storage device 1118, which communicate with each other via a bus 1130.

Processing device 1102 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. In one embodiment, processing device 1102 may include one or processing cores. The processing device 1102 is configured to execute the processing logic 1126 for performing the operations discussed herein. In one embodiment, processing device 1102 can be part of any of the computing systems described herein. Alternatively, the computing system 1100 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1100 may further include a network interface device 1108 communicably coupled to a network 1120. The computing system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), a signal generation device 1116 (e.g., a speaker), or other peripheral devices. Furthermore, computing system 1100 may include a graphics processing unit 1122, a video processing unit 1128 and an audio processing unit 1132. In another embodiment, the computing system 1100 may include a chipset (not illustrated), which refers to a group of integrated circuits, or chips, that are designed to work with the processing device 1102 and controls communications between the processing device 1102 and external devices. For example, the chipset may be a set of chips on a motherboard that links the processing device 1102 to very high-speed devices, such as main memory 1104 and graphic controllers, as well as linking the processing device 1102 to lower-speed peripheral buses of peripherals, such as USB, PCI or ISA buses.

The data storage device 1118 may include a computer-readable storage medium 1124 on which is stored software 1126 embodying any one or more of the methodologies of functions described herein. The software 1126 may also reside, completely or at least partially, within the main memory 1104 as instructions 1126 and/or within the processing device 1102 as processing logic 1126 during execution thereof by the computing system 1100; the main memory 1104 and the processing device 1102 also constituting computer-readable storage media.

The computer-readable storage medium 1124 may also be used to store instructions 1126 utilizing the processing device 1102, such as described with respect to FIG. 1, and/or a software library containing methods that call the above applications. While the computer-readable storage medium 1124 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 of a processor comprises: a processor core comprising a pipeline; cache memory coupled to the processor core; and a hardware prefetcher coupled to the processor core and the cache memory, wherein the hardware prefetcher is a region-based hardware prefetcher to track memory regions of a predefined region size; wherein the hardware prefetcher is operative to: receive from the pipeline incoming requests; track a plurality of streams in a stream table with stream entries, each stream entry to track a different memory region of the predefined size; generate a prefetch request for a cache line in one region tracked by one stream entry; determine whether the prefetch request goes beyond a page boundary of the one memory region; generate a rollover request with information to create a new stream entry to track a successive memory region when the prefetch request goes beyond the page boundary of the one memory region; in response to the rollover request, create a new stream entry in the stream table with the information to track the successive memory region; and generate a subsequent prefetch request to the successive memory region.

In Example 2, in the subject matter of Example 1, the hardware prefetcher is further operative to track the plurality of streams with the stream entries and a new stream with the new stream entry.

In Example 3, in the subject matter of any of Examples 1-2, the stream entries and the new stream entry each comprise: a tracking region offset that indicates an index of a tracking region to be tracked in a memory address space; a home line (HL) to refer to an address of a next line to be prefetched; a direction indicator to indicate whether to prefetch in a forward direction or a backward direction; a page size of the tracking region to indicate whether the tracking region is mapped to a page of the predefined size or to a larger page that is greater than the predefined size; and a stride value.

In Example 4, in the subject matter of any of Examples 1-3, the tracking region offset is a first byte of the tracking region and a tracking region size that is equal to the predefined size.

In Example 5, the subject matter of any of Examples 1-5, further comprises a cache queue coupled to the pipeline, wherein the cache queue is to store the incoming requests, the prefetch request, and the subsequent prefetch request.

In Example 6, the subject matter of any of Examples 1-5, further comprises a multiplexer coupled to receive prefetch requests from the hardware prefetcher and demand memory requests from the processor core.

In Example 7, in the subject matter of any of Examples 1-6, the hardware prefetcher is further operative to determine whether a tracking region offset of the prefetch request is less than zero to determine whether the prefetch request goes beyond the page boundary of the one memory region.

In Example 8, in the subject matter of any of Examples 1-7, the hardware prefetcher is further operative to determine whether a tracking region offset of the prefetch request is greater than the predefined size to determine whether the prefetch request goes beyond the page boundary of the one memory region.

In Example 10, in the subject matter of any of Examples 1-9, the hardware prefetcher is further operative to: determine whether the incoming requests are rollover requests; and determine whether there is a page hit in the stream table when the incoming request is a rollover request, wherein the new stream entry is created when there is no page hit in the stream table and the rollover request is dropped when there is a page hit, wherein the hardware prefetcher is to continue with non-rollover prefetching when the incoming request is not a rollover request.

In Example 11, in the subject matter of any of Examples 1-10, the hardware prefetcher is further operative to: select a stream entry from the stream table to generate a next prefetch request; determine whether an address of the next prefetch request crosses the page boundary of the one memory region; determine whether the address of the next prefetch request crosses a larger page boundary when the address crosses the page boundary of the one memory region, wherein the hardware prefetcher is to continue with non-rollover prefetching when the address does not cross the page boundary of the one memory region; generate a new rollover request when the address crosses the page boundary of the one memory region and does not cross the larger page boundary; and drop the next prefetch request and invalidate the stream entry when the next prefetch request crosses the larger page boundary.

In Example 11, in the subject matter of any of Examples 1-10, the cache memory is a level-two (L2) cache memory and the hardware prefetcher is a L2 hardware prefetcher, and wherein the L2 hardware prefetcher is to receive the incoming requests from a cache controller of the pipeline.

Various embodiments may have different combinations of the operational features described above. For instance, all optional features of the apparatuses and methods described above may also be implemented with respect to a System on Chip (SoC). Specifics in the examples may be used anywhere in one or more embodiments.

Example 12 is a System on Chip (SoC) comprises a plurality of functional units; and shared level-two (L2) cache memory coupled to the plurality of functional units, wherein a first functional unit of the plurality of functional units comprises a L2 hardware prefetcher and a L2 pipeline, wherein the L2 hardware prefetcher is operative to: receive from the L2 pipeline incoming requests; track a plurality of streams in a stream table with stream entries, each stream entry to track a different memory region of the predefined size; generate a prefetch request for a cache line in one region tracked by one stream entry; determine whether the prefetch request goes beyond a page boundary of the one memory region; generate a rollover request with information to create a new stream entry to track a successive memory region when the prefetch request goes beyond the page boundary of the one memory region; in response to the rollover request, create a new stream entry in the stream table to track the successive memory region; and generate a subsequent prefetch request to the successive memory region.

In Example 13, in the subject matter of Example 12, the first functional unit further comprises an L2 cache queue coupled to the L2 pipeline and a multiplexer coupled to the L2 cache queue, wherein the multiplexer is to receive the prefetch requests from the L2 hardware prefetcher and incoming demand memory requests from a processor core of the functional unit, and wherein the L2 cache queue is to store the prefetch requests and the incoming demand memory request received from the multiplexer.

In Example 14, in the subject matter of any of Examples 12-13, the stream entries and the new stream entry each comprise: a tracking region offset that indicates an index of a tracking region to be tracked in a memory address space; a home line (HL) to refer to an address of a next line to be prefetched; a direction indicator to indicate whether to prefetch in a forward direction or a backward direction; a page size of the tracking region to indicate whether the tracking region is mapped to a page of the predefined size or to a larger page that is greater than the predefined size; and a stride value.

Various embodiments may have different combinations of the structural features described above. For instance, all optional features of the computing system described above may also be implemented with respect to the method or process described herein and specifics in the examples may be used anywhere in one or more embodiments.

Example 15 a method comprises: receiving, by a hardware prefetcher, a request from a processor core, wherein the hardware prefetcher is a region-based hardware prefetcher to track memory regions of a predefined region size that is defined by software to be executed by the processor; tracking, by the hardware prefetcher, a plurality of streams in a stream table with stream entries, each stream entry to track a different memory region of the predefined size; generating, by the hardware prefetcher, a prefetch request to one memory region; determining, by the hardware prefetcher, whether the prefetch request goes beyond a page boundary of the one memory region; generating, by the hardware prefetcher, a rollover request with information to create a new stream entry to track a successive memory region when the prefetch request goes beyond the page boundary of the one memory region; creating, by the hardware prefetcher, a new stream entry in the stream table to track a successive memory region when the prefetch request goes beyond the page boundary of the one memory region in response to the rollover request; and generating, by the hardware prefetcher, a subsequent prefetch request to the successive memory region.

In Example 16, in the subject matter of Example 15, the creating the new stream entry comprises: populating a tracking region offset field in the new stream entry, the racking region offset field to indicate an index of a tracking region to be tracked in a memory address space; populating a home line (HL) field in the new stream entry, the HL field to refer to an address of a next line to be prefetched; populating a direction indicator field in the new stream entry, the direction indicator field to indicate whether to prefetch in a forward direction or a backward direction; populating a page size field in the new stream entry, the page size field to indicate whether the tracking region is mapped to a page of the predefined size or to a larger page that is greater than the predefined size; and populating a stride value field in the new stream entry.

In Example 17, in the subject matter of any of Example 15-16, the determining whether the prefetch request goes beyond the page boundary of the one memory region comprises determining whether a tracking region offset of the prefetch request is less than zero.

In Example 18, in the subject matter of any of Example 15-17, the determining whether the prefetch request goes beyond the page boundary of the one memory region comprises determining whether a tracking region offset of the prefetch request is greater than the predefined size.

In Example 19, the subject matter of any of Example 15-17, further comprises: determining whether the incoming requests are rollover requests; determining whether there is a page hit in the stream table when the incoming request is a rollover request, wherein the new stream entry is created when there is no page hit in the stream table and the rollover request is dropped when there is a page hit; and continuing with non-rollover prefetching when the incoming request is not a rollover request.

In Example 20, the subject matter of any of Example 15-19, further comprises: selecting a stream entry from the stream table to generate a next prefetch request; determining whether an address of the next prefetch request crosses the page boundary of the one memory region; determining whether the address of the next prefetch request crosses a larger page boundary when the address crosses the page boundary of the one memory region; continuing with non-rollover prefetching when the address does not cross the page boundary of the one memory region; generating a new rollover request when the address crosses the page boundary of the one memory region and does not cross the larger page boundary; and dropping the next prefetch request and invalidating the stream entry when the next prefetch request crosses the larger page boundary.

Various embodiments may have different combinations of the operational features described above. For instance, all optional features of the method described above may also be implemented with respect to a non-transitory, computer-readable storage medium. Specifics in the examples may be used anywhere in one or more embodiments.

Example 21 is a non-transitory, computer-readable storage medium including instructions that, when executed by a processor, cause the processor to perform the method of Examples 15-20.

Example 22 is a system comprising: a processor comprising a hardware prefetcher; and a memory device coupled to the processor, wherein the processor is configured to: receive from a pipeline incoming requests; track a plurality of streams in a stream table with stream entries, each stream entry to track a different memory region of a predefined size; generate a prefetch request for a cache line in one region tracked by one stream entry; determine whether the prefetch request goes beyond a page boundary of the one memory region; generate a rollover request with information to create a new stream entry to track a successive memory region when the prefetch request goes beyond the page boundary of the one memory region; in response to the rollover request, create a new stream entry in the stream table with the information to track the successive memory region; and generate a subsequent prefetch request to the successive memory region.

In Example 23, in the subject matter of Example 22, the stream entries and the new stream entry each comprise: a tracking region offset that indicates an index of a tracking region to be tracked in a memory address space; a home line (HL) to refer to an address of a next line to be prefetched; a direction indicator to indicate whether to prefetch in a forward direction or a backward direction; a page size of the tracking region to indicate whether the tracking region is mapped to a page of the predefined size or to a larger page that is greater than the predefined size; and a stride value.

In Example 24, in the subject matter of any of Examples 22-23, the hardware prefetcher is further operative to: determine whether the incoming requests are rollover requests; and determine whether there is a page hit in the stream table when the incoming request is a rollover request, wherein the new stream entry is created when there is no page hit in the stream table and the rollover request is dropped when there is a page hit, wherein the hardware prefetcher is to continue with non-rollover prefetching when the incoming request is not a rollover request.

Example 25 is a system comprising a system on chip (SoC) comprising a plurality of functional units, a hardware prefetcher and cache memory, wherein the hardware prefetcher is operative to perform the method of Examples 15-20.

In Example 26, the subject matter of Example 25, the SOC further comprises the subject matter of any of Examples 1-14.

Example 27 is an apparatus comprising: a processor core comprising a pipeline; cache memory coupled to the processor core; means for receiving from the pipeline incoming requests; means for tracking a plurality of streams in a stream table with stream entries, each stream entry to track a different memory region of the predefined size; means for generating a prefetch request for a cache line in one region tracked by one stream entry; means for determining whether the prefetch request goes beyond a page boundary of the one memory region; means for generating a rollover request with information to create a new stream entry to track a successive memory region when the prefetch request goes beyond the page boundary of the one memory region; means for creating a new stream entry in the stream table with the information to track the successive memory region in response to the rollover request; and means for generating a subsequent prefetch request to the successive memory region.

In Example 28, the subject matter of Example 27, the subject matter of any of Examples 1-14.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method comprising:
   receiving, by a hardware prefetcher, a request from a processor core, wherein the hardware prefetcher is a region-based hardware prefetcher to track memory regions of a predefined region size that is defined by software to be executed by the processor;
   tracking, by the hardware prefetcher, a plurality of streams in a stream table with stream entries, wherein each stream entry is to track a different memory region of the predefined region size;
   generating, by the hardware prefetcher, a prefetch request to a first memory region;
   determining, by the hardware prefetcher, whether the prefetch request goes beyond a page boundary of the first memory region;
   generating, by the hardware prefetcher, a rollover request that includes information to create a second stream entry with which to track a successive memory region when the prefetch request goes beyond the page boundary of the first memory region;
   determining whether an incoming request is a rollover request;
   determining whether there is a page hit in the stream table when the incoming request is a rollover request;

creating, by the hardware prefetcher, the second stream entry in the stream table to track a successive memory region when the prefetch request goes beyond the page boundary of the first memory region;

dropping the rollover request when there is a page hit in the stream table;

generating, by the hardware prefetcher and using the second stream entry, a subsequent prefetch request to the successive memory region; and continuing with non-rollover prefetching when the incoming request is not a rollover request.

2. The method of claim 1, wherein the creating the second stream entry comprises:

populating a tracking region offset field in the second stream entry, the tracking region offset field to indicate an index of a tracking region to be tracked in a memory address space;

populating a home line (HL) field in the second stream entry, the HL field to refer to an address of a next line to be prefetched;

populating a direction indicator field in the second stream entry, the direction indicator field to indicate whether to prefetch in a forward direction or a backward direction;

populating a page size field in the second stream entry, the page size field to indicate whether the tracking region is mapped to a page of the predefined size or to a larger page that is greater than the predefined size; and populating a stride value field in the second stream entry.

3. The method of claim 1, wherein the determining whether the prefetch request goes beyond the page boundary of the first memory region comprises determining whether a tracking region offset of the prefetch request is less than zero.

4. The method of claim 1, wherein the determining whether the prefetch request goes beyond the page boundary of the first memory region comprises determining whether a tracking region offset of the prefetch request is greater than the predefined size.

5. The method of claim 1, further comprising:

selecting a third stream entry from the stream table to generate a next prefetch request;

determining whether an address of the next prefetch request crosses the page boundary of the first memory region;

determining whether the address of the next prefetch request crosses a larger page boundary when the address crosses the page boundary of the first memory region;

continuing with non-rollover prefetching when the address does not cross the page boundary of the first memory region;

generating a new rollover request when the address crosses the page boundary of the first memory region and does not cross the larger page boundary; and dropping the next prefetch request and invalidating the third stream entry when the next prefetch request crosses the larger page boundary.

6. A processor comprising:

a processor core comprising a pipeline;

cache memory coupled to the processor core; and a hardware prefetcher coupled to the processor core and the cache memory, wherein the hardware prefetcher is a region-based hardware prefetcher to track memory regions of a predefined region size; wherein the hardware prefetcher is to:

receive incoming requests from the pipeline;

track a plurality of streams in a stream table with stream entries, wherein each stream entry is to track a different memory region of the predefined region size;

generate a prefetch request for a cache line in a first memory region tracked by a first stream entry;

determine whether the prefetch request goes beyond a page boundary of the first memory region;

generate a rollover request that includes information to create a second stream entry with which to track a successive memory region when the prefetch request goes beyond the page boundary of the first memory region;

determine whether an incoming request is a rollover request;

determine whether there is a page hit in the stream table when the incoming request is a rollover request;

create the second stream entry in the stream table with the information when there is no page hit in the stream table;

drop the rollover request when there is a page hit in the stream table;

generate, using the second stream entry, a subsequent prefetch request to the successive memory region; and continue with non-rollover prefetching when the incoming request is not a rollover request.

7. The processor of claim 6, wherein the hardware prefetcher is further to track the plurality of streams in the stream table with the stream entries, including the first stream entry and the second stream entry.

8. The processor of claim 6, wherein the stream entries and the second stream entry each comprises:

a tracking region offset that indicates an index of a tracking region to be tracked in a memory address space;

a home line (HL) to refer to an address of a next line to be prefetched;

a direction indicator to indicate whether to prefetch in a forward direction or a backward direction;

a page size of the tracking region to indicate whether the tracking region is mapped to a page of the predefined size or to a larger page that is greater than the predefined size; and a stride value.

9. The processor of claim 8, wherein the tracking region offset is a first byte of the tracking region and a tracking region size is equal to the predefined region size.

10. The processor of claim 6, further comprising a cache queue coupled to the pipeline, wherein the cache queue is to store the incoming requests, the prefetch request, and the subsequent prefetch request.

11. The processor of claim 10, further comprising a multiplexer coupled to receive prefetch requests from the hardware prefetcher and demand memory requests from the processor core.

12. The processor of claim 6, wherein, to determine whether the prefetch request goes beyond the page boundary of the first memory region, the hardware prefetcher is further to determine whether a tracking region offset of the prefetch request is less than zero.

13. The processor of claim 6, wherein, to determine whether the prefetch request goes beyond the page boundary of the first memory region, the hardware prefetcher is further to determine whether a tracking region offset of the prefetch request is greater than the predefined region size.

14. The processor of claim 6, wherein the hardware prefetcher is further to:
   select a third stream entry from the stream table to generate a next prefetch request;
   determine whether an address of the next prefetch request crosses the page boundary of the first memory region;
   determine whether the address of the next prefetch request crosses a larger page boundary when the address crosses the page boundary of the first memory region, wherein the hardware prefetcher is to continue with non-rollover prefetching when the address does not cross the page boundary of the first memory region;
   generate a new rollover request when the address crosses the page boundary of the first memory region and does not cross the larger page boundary; and
   drop the next prefetch request and invalidate the third stream entry when the next prefetch request crosses the larger page boundary.

15. The processor of claim 6, wherein the cache memory is a level-two (L2) cache memory and the hardware prefetcher is a L2 hardware prefetcher, and wherein the L2 hardware prefetcher is to receive the incoming requests from a cache controller of the pipeline.

16. A system on chip (SoC) comprising:
   a plurality of functional units; and
   shared level-two (L2) cache memory coupled to the plurality of functional units, wherein a first functional unit of the plurality of functional units comprises a L2 hardware prefetcher and a L2 pipeline, wherein the L2 hardware prefetcher is to:
      receive incoming requests from the L2 pipeline;
      track a plurality of streams in a stream table with stream entries, wherein each stream entry is to track a different memory region of a predefined size;
      generate a prefetch request for a cache line in a first memory region tracked by a first stream entry;
      determine whether the prefetch request goes beyond a page boundary of the first memory region;
      generate a rollover request that includes information to create a second stream entry with which to track a successive memory region when the prefetch request goes beyond the page boundary of the first memory region;
      determine whether an incoming request is a rollover request;
      determine whether there is a page hit in the stream table when the incoming request is a rollover request;
      create the second stream entry in the stream table with the information when there is no page hit in the stream table;
      generate, using the second stream entry, a subsequent prefetch request to the successive memory region; and
      continue with non-rollover prefetching when the incoming request is not a rollover request.

17. The SoC of claim 16, wherein the first functional unit further comprises an L2 cache queue coupled to the L2 pipeline and a multiplexer coupled to the L2 cache queue, wherein the multiplexer is to receive prefetch requests from the L2 hardware prefetcher and incoming demand memory requests from a processor core of the first functional unit, and wherein the L2 cache queue is to store the prefetch requests and the incoming demand memory requests received from the multiplexer.

18. The SoC of claim 16, wherein the stream entries and the second stream entry each comprise:

a tracking region offset that indicates an index of a tracking region to be tracked in a memory address space;
a home line (HL) to refer to an address of a next line to be prefetched;
a direction indicator to indicate whether to prefetch in a forward direction or a backward direction;
a page size of the tracking region to indicate whether the tracking region is mapped to a page of the predefined size or to a larger page that is greater than the predefined size; and
a stride value.

19. A processor comprising:
   a processor core comprising a pipeline;
   cache memory coupled to the processor core; and
   a hardware prefetcher coupled to the processor core and the cache memory, wherein the hardware prefetcher is a region-based hardware prefetcher to track memory regions of a predefined region size; wherein the hardware prefetcher is to:
      receive incoming requests from the pipeline;
      track a plurality of streams in a stream table with stream entries, wherein each stream entry is to track a different memory region of the predefined region size;
      generate a prefetch request for a cache line in a first memory region tracked by a first stream entry;
      determine whether the prefetch request goes beyond a page boundary of the first memory region;
      generate a rollover request that includes information to create a second stream entry with which to track a successive memory region when the prefetch request goes beyond the page boundary of the first memory region;
      determine whether an incoming request is a rollover request;
      determine whether there is a page hit in the stream table when the incoming request is a rollover request;
      create the second stream entry in the stream table with the information when there is no page hit in the stream table;
      drop the rollover request when there is a page hit in the stream table;
      generate, using the second stream entry, a subsequent prefetch request to the successive memory region; and
      continue with non-rollover prefetching when the incoming request is not a rollover request.

20. A processor comprising:
   a processor core comprising a pipeline;
   cache memory coupled to the processor core; and
   a hardware prefetcher coupled to the processor core and the cache memory, wherein the hardware prefetcher is a region-based hardware prefetcher to track memory regions of a predefined region size; wherein the hardware prefetcher is to:
      receive incoming requests from the pipeline;
      track a plurality of streams in a stream table with stream entries, wherein each stream entry is to track a different memory region of the predefined region size;
      generate a prefetch request for a cache line in a first memory region tracked by a first stream entry;
      determine whether the prefetch request goes beyond a page boundary of the first memory region;
      generate a rollover request that includes information to create a second stream entry with which to track a successive memory region when the prefetch request goes beyond the page boundary of the first memory region;

in response to the rollover request, create the second stream entry in the stream table with the information;

generate, using the second stream entry, a subsequent prefetch request to the successive memory region;

select a third stream entry from the stream table to generate a next prefetch request;

determine whether an address of the next prefetch request crosses the page boundary of the first memory region;

determine whether the address of the next prefetch request crosses a larger page boundary when the address crosses the page boundary of the first memory region;

continue with non-rollover prefetching when the address does not cross the page boundary of the first memory region;

generate a new rollover request when the address crosses the page boundary of the first memory region and does not cross the larger page boundary; and drop the next prefetch request and invalidate the third stream entry when the next prefetch request crosses the larger page boundary.

\* \* \* \* \*